April 8, 1941.    J. N. GOURLEY    2,237,484
LUBRICATION FITTING
Filed March 26, 1938
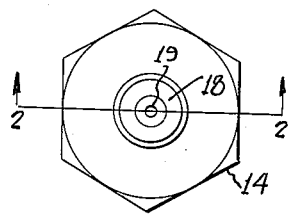
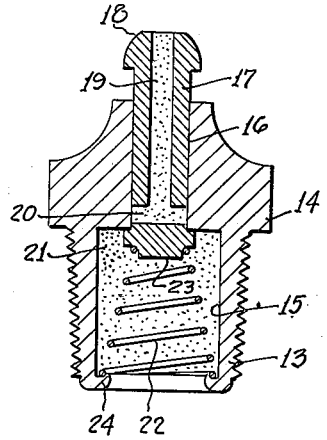
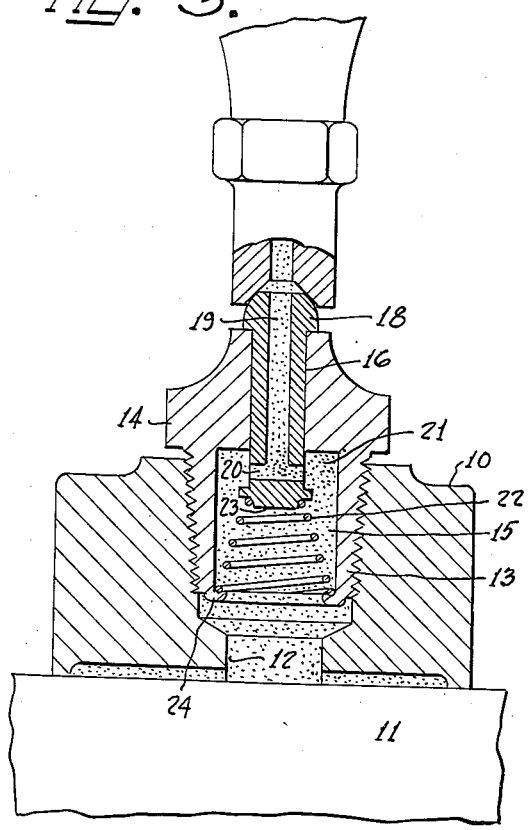
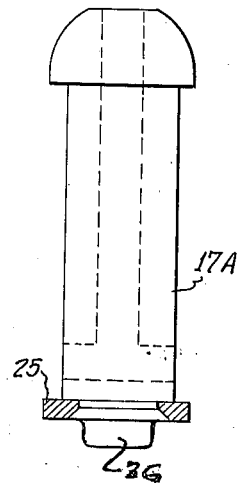
INVENTOR
JAMES N. GOURLEY
BY
ATTORNEY Patented Apr. 8, 1941

2,237,484

UNITED STATES PATENT OFFICE 2,237,484

LUBRICATION FITTING

James N. Gourley, Portland, Oreg.

Application March 26, 1938, Serial No. 198,262

1 Claim. (Cl. 184—105)

This invention relates generally to the art of lubrication, and particularly to a lubrication fitting.

The main object of this invention is the construction of a lubrication fitting which will not rely upon the pressure of the lubricant to unseat the closure valve thereof.

The second object is to construct a fitting wherein the physical force of applying the grease gun to the fitting is employed to open the fitting for the admission of lubricant.

The third object is the elimination of any tendency for the fitting to "freeze" or to become inoperative.

The fourth object is to construct a fitting of the class described which will be easy to manufacture and which will visibly indicate whether the fitting is open or closed.

I accomplish these and other objects in the manner set forth in the following specification as illustrated in the accompanying drawing, in which:

Fig. 1 is a plan of the device.

Fig. 2 is a section taken along the line 2—2 in Fig. 1.

Fig. 3 is a sectional view similar to Fig. 2 showing the grease gun applied to the fitting and holding same in an open position and showing the bearing to which the fitting is attached in section.

Fig. 4 is an enlarged detail of the plunger showing an alternate form of fastening therefor.

Similar numerals refer to similar parts throughout the several views.

Referring in detail to the drawing, there is shown a bearing 10 in which is mounted a shaft 11. The bearing 10 is provided with a lubrication opening 12 into which is threaded the end 13 of the fitting 14. The end 13 of the fitting 14 is provided with an enlarged recess 15 which communicates with the cylindrical opening 16 in which is slidably mounted a plunger 17.

The plunger 17 is provided with a head 18 which limits its movement into the fitting 14. The plunger 17 is also provided with a central opening 19 which connects with the transverse opening 20 through which lubricant 21 can enter the enlarged recess 15 and thence find its way through the opening 12 to the shaft 11. Within the recess 15 is disposed a compression spring 22, one end of which engages the plunger head 23 and the other end of which is supported by the inturned flange 24 which is formed around the open end of the recess 15.

In the form of the device shown in Fig. 4 a washer 25, which is of greater diameter than the plunger 17—A, is riveted thereon as shown in Fig. 4 leaving the projecting end 26 to receive the spring 22.

It will be seen that in Fig. 2 where no pressure is applied to the plunger 17 the openings 19 and 20 are effectively closed cutting off all communication to the recess 15 by way of the opening 19, but when the grease gun 27 is applied to the plunger 17, there is an open passageway between the gun 27 and the journal of the shaft 11.

It is a well known fact that owing to the relatively small effective area existing in the ordinary form of lubrication fitting, it is often impossible to force lubricant into and through the fitting due to what are commonly known as "frozen" fittings in which the valve mechanism has become inoperative for one reason or another. With my device any desired amount of force may be applied to the plunger 17 which itself acts as a piston to force the contents of the recess 15 into the wearing parts of the journal and makes it easily possible for the grease gun 27 to supply more lubricant and when the grease gun 27 is removed, the pressure on the newly inserted lubricant is ordinarily great enough to return the plunger 17 to a closed position, the function of the spring 22 being merely to hold the plunger 17 in a closed position after it has been moved thereto by other forces.

I claim:

A lubrication fitting consisting of a threaded body member having a cylindrical opening in its outer end and an enlarged recess within its inner threaded end, a piston mounted in said cylindrical opening extending beyond the inner and outer limits thereof and having stops at opposite ends thereof for limiting the longitudinal movement of said piston, said piston having an axial opening extending from its outermost end to a point near the innermost end where said opening extends laterally through the side of the piston in a manner that when said piston is moved to its outermost position, said lateral opening will be closed, and a spring for urging said piston toward its outermost position, the outermost end of said piston constituting a tip for applying the grease gun, the innermost end of said piston constituting a plunger for displacing lubricant confined within said enlarged cavity.

JAMES N. GOURLEY.